US011282011B2

(12) United States Patent
Richardson et al.

(10) Patent No.: US 11,282,011 B2
(45) Date of Patent: Mar. 22, 2022

(54) TASK MANAGEMENT INTERFACE FOR WELL OPERATIONS

(71) Applicant: Chevron U.S.A. Inc., San Ramon, CA (US)

(72) Inventors: Andrea Richardson, San Ramon, CA (US); Michael Rix, San Ramon, CA (US); Sarah Schoengold, San Ramon, CA (US); Ryan Hassall, San Ramon, CA (US); Daniel Orbach, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/838,007

(22) Filed: Apr. 1, 2020

(65) Prior Publication Data
US 2021/0312368 A1 Oct. 7, 2021

(51) Int. Cl.
*G06Q 10/06* (2012.01)
*G06F 3/0486* (2013.01)
*G06F 3/0482* (2013.01)

(52) U.S. Cl.
CPC ..... *G06Q 10/06316* (2013.01); *G06F 3/0482* (2013.01); *G06F 3/0486* (2013.01); *G06Q 10/06311* (2013.01)

(58) Field of Classification Search
CPC ............ G06Q 10/00–50/00; G06F 1/00–21/00
USPC ................................................ 705/7.11–7.42
See application file for complete search history.

(56) References Cited

U.S. PATENT DOCUMENTS

| | | | | |
|---|---|---|---|---|
| 6,826,483 | B1* | 11/2004 | Anderson | G01V 1/30 702/13 |
| 6,983,188 | B2* | 1/2006 | Loughran | G16Z 99/00 700/99 |
| 7,010,760 | B2* | 3/2006 | Arnstein | G06Q 10/06 715/853 |
| 7,366,678 | B2* | 4/2008 | Greenstein | G06Q 10/06375 705/7.37 |
| 7,774,184 | B2* | 8/2010 | Balci | G06Q 10/0633 703/10 |
| 7,876,465 | B2* | 1/2011 | Matsueda | G06Q 10/06 358/1.15 |
| 9,506,305 | B2* | 11/2016 | Leuchtenberg | E21B 33/064 |
| 10,385,674 | B2* | 8/2019 | Ahmed | E21B 44/00 |
| 10,678,967 | B2* | 6/2020 | Babin | G01V 11/00 |
| 2001/0055123 | A1* | 12/2001 | Ryan | G06F 3/1259 358/1.12 |
| 2002/0040312 | A1* | 4/2002 | Dhar | G06Q 40/025 705/7.26 |
| 2002/0052769 | A1* | 5/2002 | Navani | G06Q 10/08 719/316 |
| 2003/0153991 | A1* | 8/2003 | Visser | G06Q 10/10 700/79 |

(Continued)

*Primary Examiner* — Alan S Miller
(74) *Attorney, Agent, or Firm* — Esplin & Associates, PC

(57) ABSTRACT

Based on demand signals from multiple sources, the timing and amount of well tasks, such as material delivery, drilling, and/or waste removal, may be predicted. The well tasks may be organized as card elements on a graphical user interface, with the card elements being arranged based on the sequence in which the well tasks are scheduled. The sequence of the well tasks and the arrangement of the card elements on the graphical user interface may be updated automatically based on real-time data.

20 Claims, 16 Drawing Sheets

(56) References Cited

U.S. PATENT DOCUMENTS

| | | | | |
|---|---|---|---|---|
| 2006/0074730 | A1* | 4/2006 | Shukla | G06Q 10/0633 705/7.27 |
| 2007/0136117 | A1* | 6/2007 | Matsueda | G06Q 10/06 358/1.15 |
| 2007/0199721 | A1* | 8/2007 | Givens | G06Q 10/06312 166/382 |
| 2007/0266368 | A1* | 11/2007 | Szpak | G06F 9/451 717/105 |
| 2008/0046834 | A1* | 2/2008 | Yu | G06Q 10/10 715/771 |
| 2008/0091496 | A1* | 4/2008 | Gurpinar | G06Q 10/06311 705/7.13 |
| 2008/0126168 | A1* | 5/2008 | Carney | G06Q 10/06316 705/7.26 |
| 2009/0125362 | A1* | 5/2009 | Reid | G06Q 10/10 705/7.27 |
| 2009/0216453 | A1* | 8/2009 | Zaeper | E21B 31/03 702/6 |
| 2009/0234699 | A1* | 9/2009 | Steinglass | G06Q 10/06313 705/7.23 |
| 2010/0306637 | A1* | 12/2010 | Jacobs | G06Q 10/0631 715/212 |
| 2012/0123863 | A1* | 5/2012 | Kaul | G06Q 30/02 705/14.52 |
| 2013/0139164 | A1* | 5/2013 | Balko | G06F 8/41 718/102 |
| 2014/0196949 | A1* | 7/2014 | Hareland | E21B 44/00 175/27 |
| 2015/0067687 | A1* | 3/2015 | Turner | G06F 9/4881 718/102 |
| 2015/0090498 | A1* | 4/2015 | Hareland | E21B 45/00 175/48 |
| 2017/0364852 | A1* | 12/2017 | Grabovski | G06Q 10/06316 |
| 2018/0075544 | A1* | 3/2018 | Passolt | G06Q 50/02 |
| 2018/0113962 | A1* | 4/2018 | Babin | G01V 11/00 |
| 2018/0266233 | A1* | 9/2018 | Ahmed | E21B 47/047 |
| 2019/0178059 | A1* | 6/2019 | Zheng | E21B 41/0092 |
| 2020/0327481 | A1* | 10/2020 | Allouche | E21B 41/00 |
| 2020/0355063 | A1* | 11/2020 | Van Vliet | G06G 7/48 |
| 2020/0370413 | A1* | 11/2020 | Phillips | E21B 47/007 |

\* cited by examiner

310

320

TASK MANAGEMENT INTERFACE FOR WELL OPERATIONS

FIELD

The present disclosure relates generally to the field of managing tasks for well operations.

BACKGROUND

Coordinating tasks for well operations may be both difficult and time-consuming. Inaccurate coordination of tasks, such as inaccurate forecasting of timing and/or amount of tasks, may result in unnecessary downtimes and inefficient well operations.

SUMMARY

This disclosure relates to managing tasks. Operating information for a well operation and/or other information may be obtained. The operating information may characterize values of well operation parameters. The values of well operation parameters may include static values and dynamic values. Well operation tasks may be determined based on the values of well operation parameters and/or other information. A sequence of the well operation tasks may be determined based on the values of well operation parameters and/or other information. Presentation of a graphical user interface on a display may be effectuated. The graphical user interface may provide visualization of the well operation tasks. The visualization of the well operation tasks may include the well operation tasks arranged based on the sequence of the well operation tasks. User modification of the well operation tasks and/or the sequence of the well operation tasks may be received. The visualization of the well operation tasks may be modified based on the user modification and/or other information.

A system that manages tasks may include one or more electronic storage, one or more processors and/or other components. The electronic storage may store operating information, information relating to a well operation, information relating to well operation parameters, information relating to values of well operation parameters, information relating to well operation tasks, information relating to sequence of well operation tasks, information relating to graphical user interface, information relating to visualization of well operation tasks, information relating to user modification of well operation tasks, information relating to user modification of sequence of well operation tasks, and/or other information.

The processor(s) may be configured by machine-readable instructions. Executing the machine-readable instructions may cause the processor(s) to facilitate managing tasks. The machine-readable instructions may include one or more computer program components. The computer program components may include one or more of an operating information component, a task component, a visualization component, a modification component, and/or other computer program components.

The operating information component may be configured to obtain operating information for a well operation and/or other information. The operating information may characterize values of well operation parameters. The values of well operation parameters may include static values and/or dynamic values. In some implementations, the static values of well operation parameters may reflect one or more fixed or estimated properties of a drilling tool or a drilling location. In some implementations, the dynamic values of well operation parameters may reflect one or more operation values of the drilling tool or the drilling location.

The task component may be configured to determine well operation tasks. The well operation tasks may be determined based on the values of well operation parameters and/or other information. In some implementations, the well operation tasks may include a drilling task, a material-provision task, and/or a material-removal task.

The task component may be configured to determine a sequence of the well operation tasks. The sequence of the well operation tasks may be determined based on the values of well operation parameters and/or other information.

In some implementations, the sequence of the well operation tasks may be determined further based on historical information for the well operation. The historical information for the well operation may be determined based on the values of well operation parameters.

The visualization component may be configured to effectuate presentation of a graphical user interface on a display. The graphical user interface may provide visualization of the well operation tasks. The visualization of the well operation tasks may include the well operation tasks arranged based on the sequence of the well operation tasks and/or other information.

In some implementations, the visualization of the well operation tasks may include card elements and/or other elements. The card elements may represent individual ones of the well operation tasks. The card elements may be arranged based on the sequence of the well operation tasks and/or other information.

The modification component may be configured to receive user modification of the well operation tasks and/or the sequence of the well operation tasks. The modification component may modify the visualization of the well operation tasks based on the user modification and/or other information.

In some implementations, the user modification may be received based on user interaction with the card elements. The user interaction with the card elements may include modification of the arrangement of the card elements. The user interaction with the card elements may include combination of at least two of the card elements.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to methods and systems for managing tasks. Based on demand signals from multiple sources, the timing and amount of well tasks, such as material delivery, drilling, and/or waste removal, may be predicted. The well tasks may be organized as card elements on a graphical user interface, with the card elements being arranged based on the sequence in which the well tasks are scheduled. The sequence of the well tasks and the arrangement of the card elements on the graphical user interface may be updated automatically based on real-time data.

Figure 1:
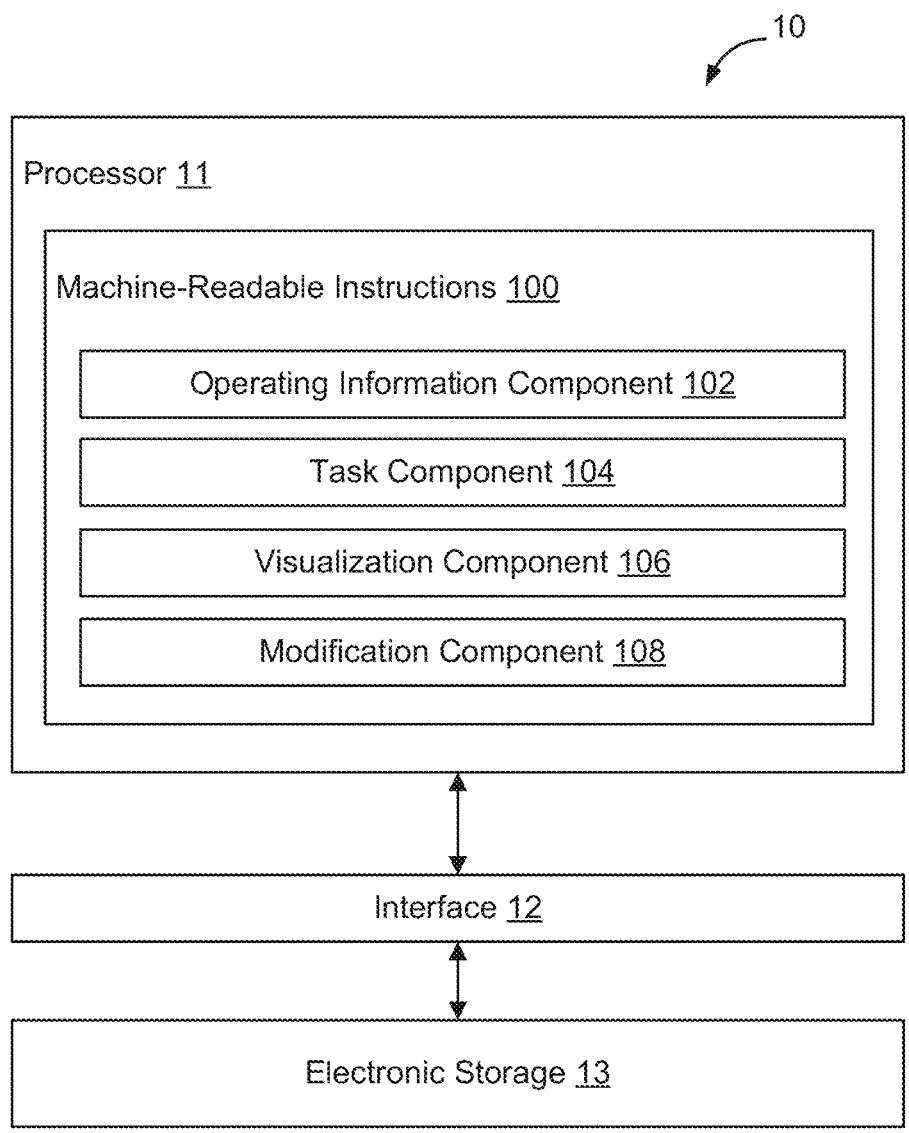
FIG. 1 illustrates an example system that manages tasks.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Operating information for a well operation and/or other information may be obtained by the processor 11. The operating information may characterize values of well operation parameters. The values of well operation parameters may include static values and dynamic values. Well operation tasks may be determined by the processor 11 based on the values of well operation parameters and/or other information. A sequence of the well operation tasks may be determined by the processor 11 based on the values of well operation parameters and/or other information. Presentation of a graphical user interface on a display may be effectuated by the processor 11. The graphical user interface may provide visualization of the well operation tasks. The visualization of the well operation tasks may include the well operation tasks arranged based on the sequence of the well operation tasks. User modification of the well operation tasks and/or the sequence of the well operation tasks may be received by the processor 11. The visualization of the well operation tasks may be modified by the processor 11 based on the user modification and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store operating information, information relating to a well operation, information relating to well operation parameters, information relating to values of well operation parameters, information relating to well operation tasks, information relating to sequence of well operation tasks, information relating to graphical user interface, information relating to visualization of well operation tasks, information relating to user modification of well operation tasks, information relating to user modification of sequence of well operation tasks, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate managing tasks. The machine-readable instructions 100 may include one or more computer program components. The machine-readable instructions 100 may include one or more of an operating information component 102, a task component 104, a visualization component 106, a modification component 108, and/or other computer program components.

The operating information component 102 may be configured to obtain operating information for a well operation and/or other information. Obtaining operating information may include one or more of accessing, acquiring, analyzing, determining, examining, identifying, loading, locating, opening, receiving, retrieving, reviewing, selecting, storing, utilizing, and/or otherwise obtaining the operating information. The operating information component 102 may be configured to obtain the operating information from one or more locations. For example, the operating information component 102 may obtain operating information from a storage location, such as the electronic storage 13, electronic storage of a device accessible via a network, and/or other locations. The operating information component 102 may obtain operating information from one or more hardware components (e.g., a computing device, a component of a computing device, a sensor, a component of a drilling tool) and/or one or more software components (e.g., software running on a computing device). The operating information component 102 may be obtained from a single source or from multiple sources.

The operating information component 102 may be configured to obtain the operating information before, during, and/or after the well operation. For example, the operating information component 102 may obtain the operating information before the well operation to facilitate planning of the well operation. The operating information component 102 may obtain the operating information during the well operation to obtain real-time data for the well operation. The operating information component 102 may obtain the operating information after the well operation to obtain historical data for the well operation. Operating information may be stored within a single file or multiple files.

A well may refer to a hole or a tunnel in the ground. A well may be drilled in the ground for exploration and/or recovery of natural resources in the ground. For example, a well may be drilled in the ground to aid in extraction of petrochemical fluid (e.g., oil, gas, petroleum, fossil fuel). A well may be drilled in one or more directions. For example, a well may include a vertical well, a horizontal well, a deviated well, and/or other type of well.

A well operation may refer to an operation relating to a well. A well operation may refer to performance of work on and/or using a well. A well operation may include one or more tasks. A well operation may be associated with one or more stages of well usage, such as a well site preparation stage (preparation of aboveground infrastructure, such as pads and access roads), a drilling stage (drilling the well), a cementing stage (well casing insertion and cementing), a well completion stage (making the well ready for production), a production stage (recovery of natural resources), a well abandonment stage, and/or other stages.

A well operation parameter may refer to a numerical and/or other measurable factor that form one of a set that defines a well operation and/or sets the conditions of a well operation. A well operation parameter may include parameters of the well, parameters of tools for the well, and/or parameters of other things that affect the well. For example, a well operation parameter may include properties of location at which a well is drilled (drilling location) and/or properties of a tool used for the well (e.g., a drilling tool, natural resource recovery tool, waste/by-product removal tool). A well operation parameter may include one or more features and/or qualities of the drilling location and/or the tool. A well operation parameter may include a parameter applied and/or used to operate the tool and/or a condition of the environment around and/or near the tool during operation. For example, for a drilling tool, a well operation parameter may include one or more of key indicators, drilling depth, total gas present, hookload, depth of bit, block position, torque, rotation speed, rate of penetration, weight on bit, standpipe pressure, flowrate, pressure, stress, strain, mud weight in/out, active pit total, volume change, hole displacement, tank volume, strokes speed, pump rate, equivalent circulating density, equivalent static density, whether one or more pumps are on or off, pick-up weight, slack-off weight, direction of movement of bit depth, direction of movement of block position, reamer neutral weight, bottom hole assembly speed, drag, block weight, friction factor, trip number, tool vibration, and/or other operation parameter(s)

The operating information may characterize values of well operation parameters. Values of well operation parameters may refer to numerical and/or other measurable quantity for the well operation parameters. The values of well operation parameters may correspond to quantity and/or quality of the well operation parameters. The values of well operation parameters may correspond to historical values, real-time values, and/or planned values. For example, the values of well operation parameter may include values that were used in a completed well operation. The values of well operation parameter may include real-time data of an ongoing well operation (e.g., sensor data from a drilling rig, a storage tank, etc.). The values of well operation parameter may include values to be used (e.g., recommended values, values in an operation plan) in a well operation.

The operating information may characterize values of well operation parameters by including information that characterizes (e.g., reflects, quantifies, identifies, defines) one or more values, qualities, attributes, features, and/or other aspects of the values of well operation parameters. For example, the operating information may characterize values of well operation parameters by including information that makes up and/or is used to determine the values of well operation parameters. Other types of operating information are contemplated.

The values of well operation parameters may include static values and/or dynamic values. A static value of well operation parameters may refer to a value of well operation parameters that do not change. A static value of well operation parameters may refer to a value of well operation parameters that do not change with time and/or location (e.g., depth of drilling). For example, a static value of well operation parameters may reflect one or more fixed or estimated properties of a drilling tool. As another example, a static value of well operation parameters may reflect one or more fixed or estimated properties of a drilling location (e.g., fixed well data). A dynamic value of well operation parameters may refer to a value of well operation parameters that changes. A dynamic value of well operation parameters may refer to a value of well operation parameters that changes with time and/or location (e.g., depth of drilling). For example, a dynamic value of well operation parameters may reflect one or more operation values of the drilling tool or the drilling location (e.g., real-time drilling data).

The task component 104 may be configured to determine well operation tasks. A well operation task may refer to a task relating to a well operation. A well operation task may refer to work, job, assignment, and/or other task of a well operation. For example, well operation tasks may include one or more of a drilling task, a material-provision task (e.g., supply tasks), and/or a material-removal task. A drilling task may refer to a task for drilling a well. A material-provision task may refer to a task for providing materials needed to prepare, drill, and/or operate a well (e.g., supply tasks). A material-removal task may refer to a task for removing materials from preparing, drilling, and/or operating a well (e.g., waste removal tasks). A well operation task be split into multiple tasks. For example, a material-provision task may be split into a material-check task, a material-purchase task, a material-purchase confirmation task, a material-reception task, and/or other tasks. Other division of tasks are contemplated.

The well operation tasks may be determined based on the values of well operation parameters and/or other information. Determining a well operating task may include identifying the well operation task, determining properties of the well operation task, determining timing of the well operation task, and/or determining other aspects of the well operation task. The values of well operation parameters may be used to determine which well operation task should be performed for the well, how the well operation task should be performed, and/or when the operation task should be performed. For example, for a material-provision task, real-time data of key indicators for a well drilling obtained by the operating information component 102 may be used to predict and/or recommend the type and/or quantity of casing and cement materials to be ordered.

In some implementations, the well operation tasks may be determined further based on historical information for the well operation. Historical information may refer to information on previous well operations and/or previous well operation tasks. Historical information may include information on how and/or when previous well operations and/or previous well operation tasks were performed, information on success of previous well operations and/or previous well operation tasks (e.g., success rate, efficiency/performance level), and/or other information relating to previous well operations and/or previous well operation tasks. Historical information may be used to determine the well operation tasks to increase the productivity and/or efficiency of the well operation tasks. For example, based on historical information, particular well operation tasks may be recommended to improve overall performance of the well.

In some implementations, the historical information for the well operation may be determined based on the values of well operation parameters. The values of well operation parameters may be used to determine which of the historical information is relevant for well operation task determination. For example, for a material-provision task, real-time data of key indicators for a well drilling obtained by the operating information component 102 may be used to filter out inapplicable historical information and identify the relevant historical information to predict and/or recommend the type and/or quantity of casing and cement materials to be ordered.

In some implementations, the well operation tasks may be determined further based on scheduling information for the well operation. Scheduling information may refer to information on scheduled/planned well operations and/or scheduled/planned well operation tasks. Scheduling information may refer to information on coordination of multiple entities to perform an operation and/or a task, such as logistics tables and/or demand tables. Scheduling information may include information on future well operation and/or future well operation tasks. Scheduling information may be used to determine the well operation tasks to increase the productivity and/or efficiency of the well operation tasks. For example, based on scheduling information, particular well operation tasks may be recommended to take advantage of and/or not conflict with already scheduled well operation tasks. Particular well operation tasks may be recommended to comply with logistics requirements and/or to decrease downtimes.

In some implementations, the scheduling information for the well operation may be determined based on the values of well operation parameters. The values of well operation parameters may be used to determine which of the scheduling information is relevant for well operation task determination. For example, for a material-provision task, real-time data of key indicators for a well drilling obtained by the operating information component 102 may be used to filter out inapplicable scheduling information and identify the relevant scheduling information to predict and/or recommend the type and/or quantity of casing and cement materials to be ordered. Usage of other information to determine well operation tasks are contemplated.

The task component 104 may be configured to determine a sequence of well operation tasks. A sequence of well operation tasks may refer to an arrangement of the well operation tasks in a particular order. A sequence of well operation tasks may refer to an arrangement of well operation tasks in which the well operation tasks are ordered in accordance with timing of performance. The task component 104 may be configured to determine the timing of when the well operation tasks should/are recommended to be performed. For example, the task component 104 may be configured to, for a material provision task, determine the timing of when a material-check task, a material-purchase task, a material-purchase confirmation task, a material-reception task, and/or other tasks should/are recommended to be performed.

The sequence of the well operation tasks may be determined based on the values of well operation parameters and/or other information. Determining a sequence of well operating tasks may include determining in which order the well operation tasks are to be performed, determining timing of when the well operation tasks are to be performed, and/or determining other temporal aspects of the well operation tasks. The values of well operation parameters may be used to determine in what sequence and/or when the operation task should be performed. For example, for a material-provision task, real-time data of key indicators for a well drilling obtained by the operating information component 102 may be used to predict and/or recommend the order and/or the timing of when particular casing and cement materials is to be ordered.

In some implementations, the sequence of the well operation tasks may be determined further based on historical information for the well operation. Historical information may be used to determine the timing of well operation tasks to increase the productivity and/or efficiency of the well operation tasks. For example, based on historical information, particular timing of well operation tasks may be recommended to improve overall performance of the well.

In some implementations, the historical information for the well operation may be determined based on the values of well operation parameters. The values of well operation parameters may be used to determine which of the historical information is relevant for well operation task scheduling. For example, for a material-provision task, real-time data of key indicators for a well drilling obtained by the operating information component 102 may be used to filter out inapplicable historical information and identify the relevant historical information to predict and/or recommend the timing of casing and cement materials to be ordered.

In some implementations, the sequence of the well operation tasks may be determined further based on scheduling information for the well operation. Scheduling information may be used to determine the timing of well operation tasks to increase the productivity and/or efficiency of the well operation tasks. For example, based on scheduling information, particular timing of well operation tasks may be recommended to take advantage of and/or not conflict with already scheduled well operation tasks. Particular timing of well operation tasks may be recommended to comply with logistics requirements and/or to decrease downtimes.

In some implementations, the scheduling information for the well operation may be determined based on the values of well operation parameters. The values of well operation parameters may be used to determine which of the scheduling information is relevant for well operation task scheduling. For example, for a material-provision task, real-time data of key indicators for a well drilling obtained by the operating information component 102 may be used to filter out inapplicable scheduling information and identify the relevant scheduling information to predict and/or recommend the timing of casing and cement materials to be ordered. Usage of other information to determine sequence of well operation tasks are contemplated.

In some implementations, the well operation tasks and/or the sequence of well operation tasks may be updated based on updates to the operating information/values of well operation parameters. For example, real-time data of a well operation at a moment may be used to determine well operation tasks and a sequence of well operation tasks. Real-time data at a later moment may be used to update the well operation tasks and/or the sequence of well operation tasks. The initial operation tasks and/or the initial sequence of well operation tasks, determined based on real-time data at a moment in time, may be changed based on real-time data at a later moment in time.

The visualization component 106 may be configured to effectuate presentation of one or more graphical user interfaces on one or more displays. A graphical user interface may refer to a user interface with one or more visual elements. A graphical user interface may convey information in one or more visual forms. A graphical user interface may provide visualization of the well operation tasks. A graphical user interface may provide visualization of the well operation tasks by including/providing one or more visual representation of the well operation tasks. Visual representations of the well operation tasks may include numerical representations, textual representations, graphical representations, and/or other visual representations.

Visualization of the well operation tasks may include the well operation tasks arranged based on the sequence of the well operation tasks and/or other information. The graphical user interface may prevent visual representations of the well operation tasks, with the visual representations for individual well operation tasks being arranged within the graphical user interface based on the sequence of the well operation tasks. For example, the visual representations for the well operation tasks may be arranged according to the timing of the well operation tasks. In some implementations, the visualization of the well operation tasks may include card elements and/or other elements. Individual card elements may represent individual well operation tasks. The card elements may be arranged within the graphical user interface based on the sequence of the well operation tasks and/or other information.

The modification component 108 may be configured to receive user modification of the well operation tasks and/or the sequence of the well operation tasks. User modification of the well operation tasks may include user-provided commands/directions to change the well operation tasks. A change to well operation tasks may include addition of one or more new well operation tasks, removal of one or more existing well operation tasks, and/or change to one or more existing well operation tasks. User modification of the sequence of well operation tasks may include user-provide commands/directions to change the sequence of well operation tasks. A change to a sequence of well operation tasks may include addition of one or more new well operation tasks to the sequence, removal of one or more existing well operation tasks from the sequence, and/or change to timing, order, and/or arrangement of one or more existing well operation tasks within the sequence. For example, user modification may include change to timing and/or details of one or more well operation tasks. In some implementation, change to multiple existing well operation tasks within the sequence may include combination of multiple existing well operation tasks into a single well operation task.

User modification of the well operation tasks and/or the sequence of the well operation tasks may be received through one or more user interface devices, such as keyboard, mouse, microphone, camera, touch-sensitive screen, and/or other user interface devices. User modification of the well operation tasks and/or the sequence of the well operation tasks may be received through the graphical user interface(s) presented by the visualization component 106. User modification may be received based on user interaction with one or more visual elements of a graphical user interface. For example, user modification may be received based on user interaction with one more of the card elements. The user interaction with the card elements may include modification of the arrangement of the card elements, such as by moving (e.g., drag-and-dropping) a card element representing a well operation task from its original location to a new location to change the timing of the well operation task. The user interaction with the card elements may include combination two or more of the card elements. Such modification of the card elements may result in combination of the corresponding well operation tasks into a single well operation task (e.g., combining multiple material-removal task into a single material-removal task).

The modification component 108 may modify the visualization of the well operation tasks based on the user modification and/or other information. The changes made by the user to the well operation tasks and/or the sequence of well operation tasks may be reflected within the graphical user interface(s) to provide visualization of current well operation tasks/current sequence of well operation tasks. In some implementations, the modification component 108 may modify other well operations and/or other portions of the sequence of well operation tasks based on user modification of a well operation/the sequence of well operation tasks. For example, user modification of a single well operation tasks (e.g., addition, removal, change in detail, change in timing) may be propagated to other well operation tasks. User modification of a single well operation tasks may be propagated to well operation tasks that precede the modified well operation task (preceding well operation tasks), well operation tasks that coincide with the modified well operation tasks (parallel well operation tasks), and/or well operation tasks that follow the modified well operation task (subsequent well operation tasks). Modification of other well operation tasks may include change in details and/or timing of the other well operation tasks. For example, a change to a particular well operation tasks by user interaction with the corresponding card element in the graphical user interface may result in updating of one or more other well operation tasks, and the graphical user interface/visual element may be changed to visually represent updated well operation tasks and/or updated sequence of well operation tasks.

The graphical user interface may be utilized by different types of users (e.g., front line users, supervisors, business partners) to plan and schedule tasks for well operations. For example, the graphical user interface may be utilized by different types of users to predict material and/or services need for well operations. Demand signals from single or multiple source may be used for prediction, and real-time data may be used to automatically update predictions. Thus, the graphical user interface may enable sharing of task plans/schedules to increase efficiency tasks (e.g., across logistics and supply chain). In some implementations, different users may be provided with different privileges (e.g., different access levels). In some implementations, some or all of the information presented within the graphical user interface and/or some of all of the information used to determine the tasks/sequence of tasks may be exported into one or more files (e.g., excel file, report file).

Figure 3A:
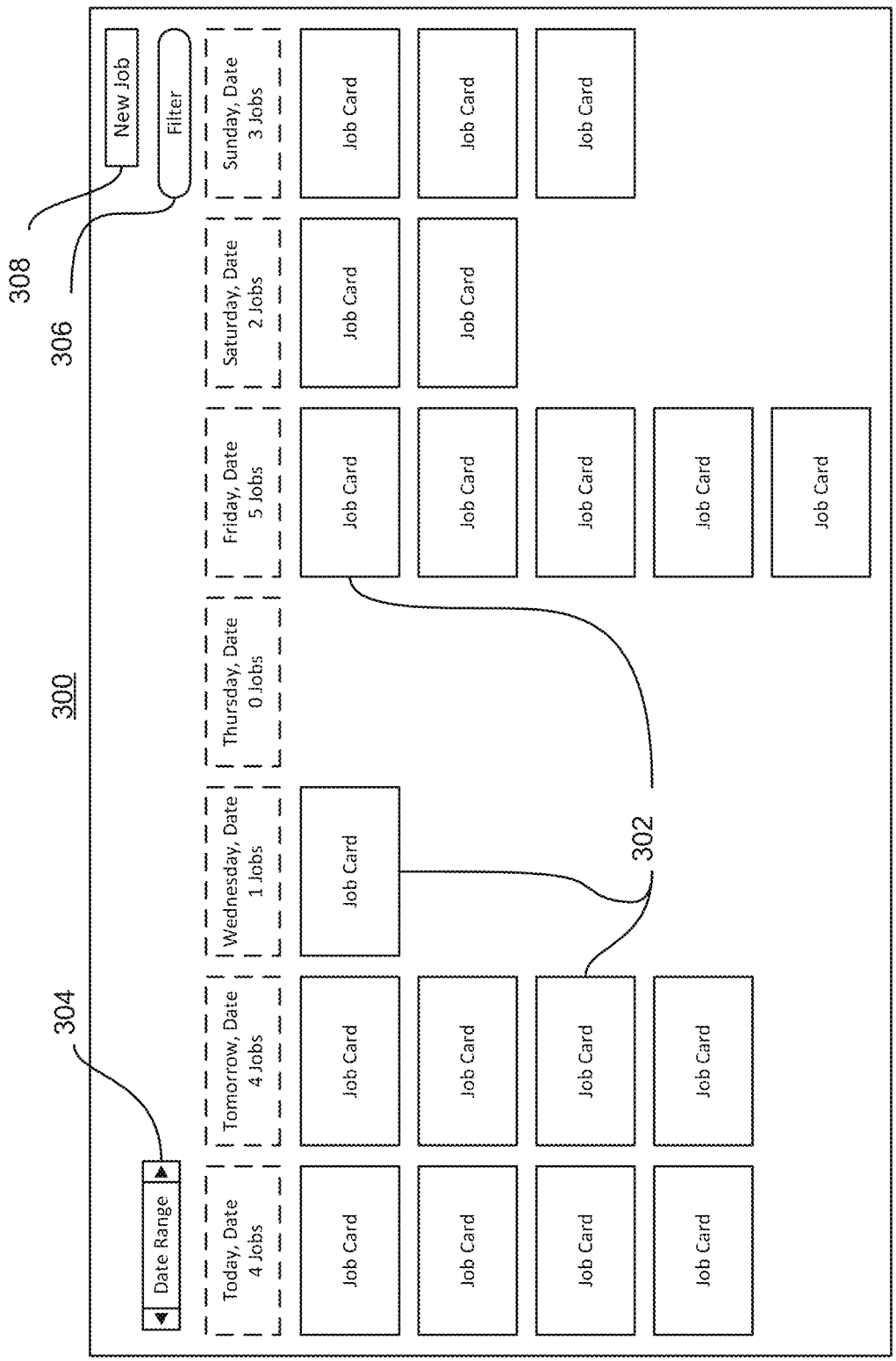
FIGS. 3A and 3B illustrate example graphical user interfaces.

FIG. 3A illustrates an example graphical user interface 300. The graphical user interface 300 may provide visualization of well operation tasks for a duration of time, such as for seven days. Individual well operations tasks may be referred to as jobs. The graphical user interface 300 may include card elements 302, a date range element 304, a filter element 306, a new job element 308, and/or other elements. The card elements 302 may represent jobs (e.g., scheduled jobs, planned jobs, recommended jobs, ordered jobs) within a single week. The card elements 302 may be arranged within the graphical user interface 300 based on the sequence in which the corresponding jobs are to be performed. For example, the card elements 302 may be arranged in columns corresponding to different days, and within individual columns according to the time at which the jobs are to be performed. The card elements 302 may include information relating to the correspond jobs, such as name of the job, type of the job, location of the job, time at which the job is to be performed, and/or other information. In some implementations, the card element 302 may include information on status of the corresponding jobs, such as whether the job has been recommended, planned, re-scheduled, ordered, delayed, canceled, or completed.

A user may interact with the cards element 302 to change the details and/or the timing of the corresponding job. For example, a user may click on a particular card element to edit one or more properties of the corresponding job. A user may move a particular card element (e.g., drag and drop the card element) to change the timing of the corresponding job. Such changes to a job may affect other jobs. For example, moving a particular card element may cause change in timing of the corresponding job to affect timing of one or more other jobs, and the card elements corresponding to the other jobs may be moved within the graphical user interface 300 to reflect the changes.

In some implementations, the graphical user interface 300 may show automatic changes caused by manual change to a job. For example, the card elements 302 may show both the original timing and the modified/updated timing of the corresponding job. In some implementations, the graphical user interface 300 may display one or more warnings and/or alerts based on automatic changes to a job. For example, the timing of a job may be allowed to automatically move (be updated) by a certain amount based on changes to other job. Based on changes to another job causing the timing of the job to be changed by an amount greater than the limit, a warning and/or an alert may be presented that the limit has been crossed. In some implementation, automatic changes to the jobs beyond the set limit may require user confirmation of the changes before the changes are accepted.

In some implementations, a change to one job may be propagated to certain types of jobs, and not propagated to other types of jobs. For example, types of jobs may include recommended jobs and planned jobs. Recommended jobs may include those jobs that are recommended based on operating information for a well operation. Planned jobs may include those job that have been planned to be performed. For example, planned jobs may include jobs manually created by a user, a job changed from a recommended job to a planned job (e.g., a recommend job that has been accepted/confirmed to be performed; a recommended job that has been changed by a user). A change to a job may be propagated to recommended jobs and not propagated to planned jobs. For example, change in timing of a job (e.g., via moving the corresponding card element) may cause timing of recommended jobs to be updated based on the new timing of the job, while the timing of planned jobs may remain the same.

In some implementations, the card elements 302 may be changed based on updated information. For example, the card elements 302 may be originally arranged within the graphical user interface 300 based on original timing of the corresponding jobs, with the original timing determined based on operating information (e.g., real time data) at a moment. Updated operating information at a later moment may be used to change the timing of the jobs, and the changes in the timing of the job may cause the card elements 302 to change (e.g., change position, change included information) within the graphical user interface 300. In some implementation, certain types of jobs may not be changed based on updated information. For example, planned jobs may not be changed based on updated operating information. In some implementation, certain types of jobs may require user approval to accept changes based on updated information. For example, planned jobs require user approval to make any changes or make changes beyond one or more limits based on updated operating information.

The date range element 304 may include visual representation of the dates covered by the graphical user interface 300. A user may interact with the date range element 304 to change the duration of time shown within the graphical user interface 300. For example, a user may interact with the middle portion of the date range element 304 to select a particular week for display within the graphical user interface. A user may interact with the left or right portions (e.g., arrows) of the date range element to move through preceding/subsequent weeks. Other selection of duration of time for presentation are contemplated.

A user may interact with the filter element 306 to filter the card element 302 shown within the graphical user interface 300. For example, a user may interact with the filter element 306 to filter the card elements 302 based on job status, services, product service line, rigs, and/or other information. Other filing of jobs card elements 302 are contemplated.

A user may interact with the new job element 308 to create a new job. User interaction with the new job element 308 may cause the graphical user interface 300 to change to receive information needed to create the new job. The new job may be shown as a new card element within the graphical user interface 300.

In some implementations, one or more notifications may be presented to a user. For example, proximate to a scheduled time for a job, the graphical user interface 300 may present one or more messages that a there is an upcoming job. As another example, reminder(s) about upcoming jobs may be presented on a periodic basis. As another example, a user may receive such messages through other communication methods, such as through SMS notification. In some implementations, the notification control may be customized to enable users to disable and/or fine-tune how notifications are generated and/or presented.

Figure 3B:
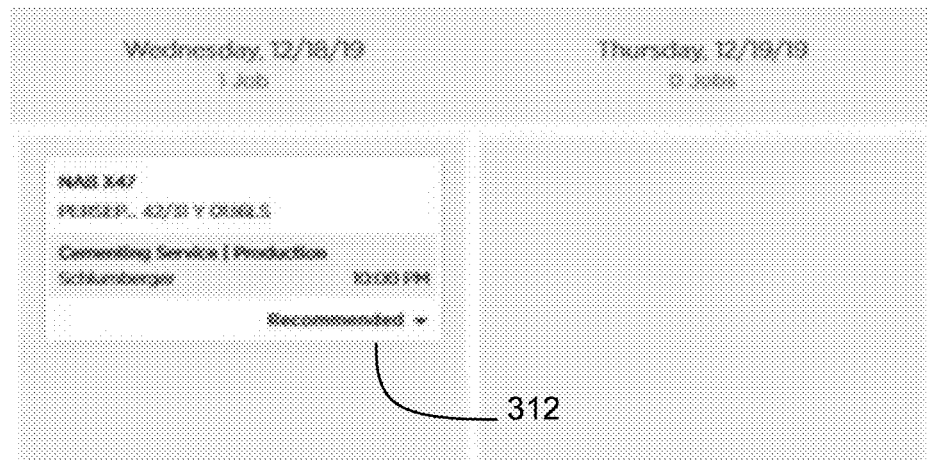
Figure 3B:
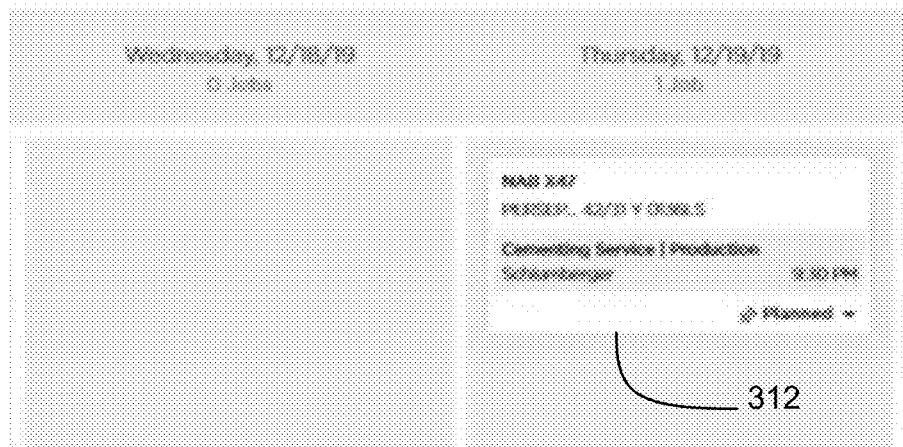

FIG. 3B illustrates example portions 310, 320 of a graphical user interface. The portions 310, 320 may include the same portion of the graphical user interface at different moments. For example, in the portion 310, a card element 312 may show that the corresponding job is to be performed at 10:00 PM on a Wednesday. A user may interact with the card element 312 to move the card element 312 so that the corresponding job is to be performed at 9:30 PM on a Thursday. The change to the graphical user interface caused by the user interaction is shown in the portion 320. User interaction with the card element 312 to change the timing of the corresponding job may cause the job to be changed from being a recommended job to a planned job.

Figure 4A:
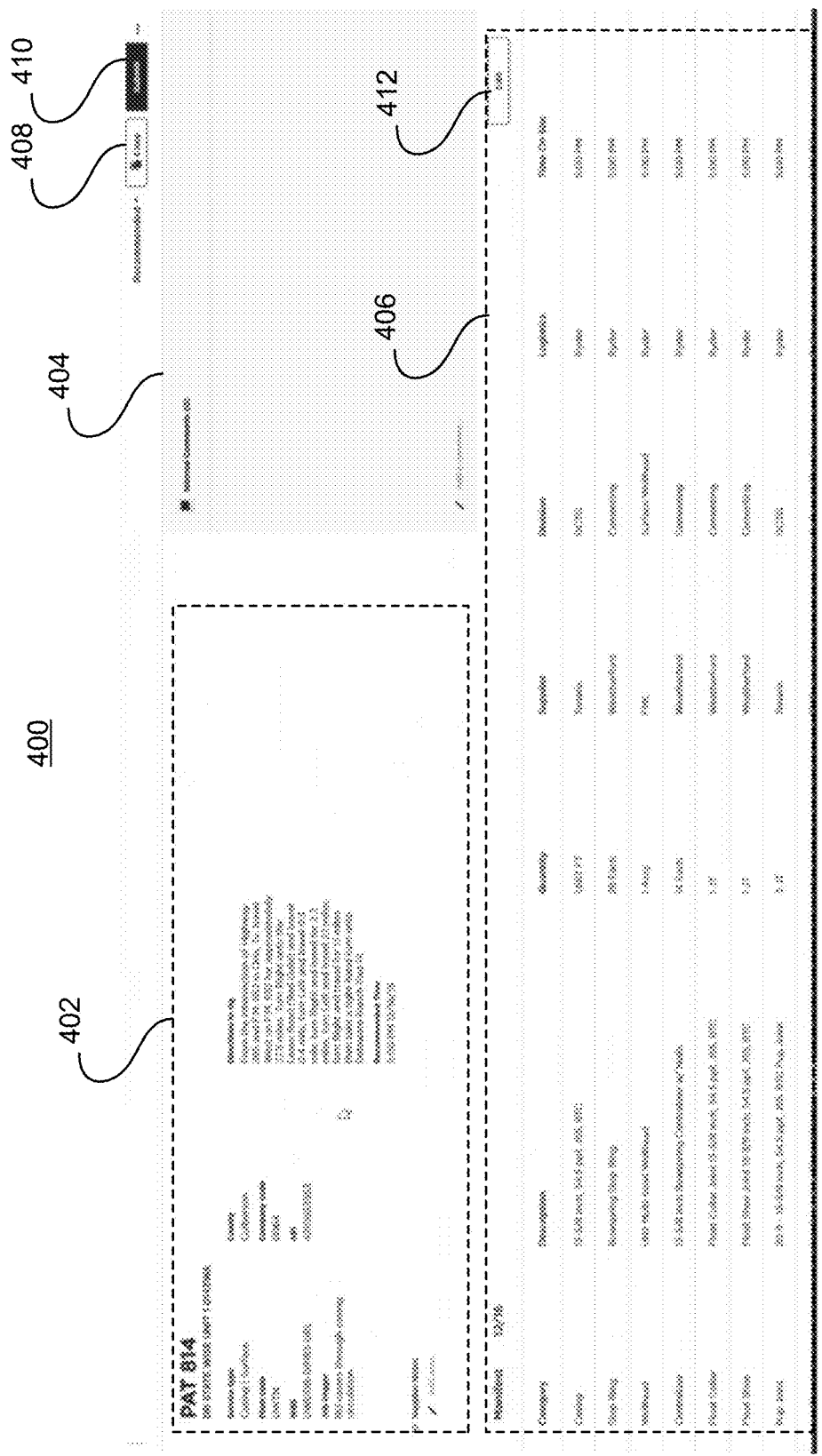
FIGS. 4A, 4B, and 4C illustrate example graphical user interfaces.

FIG. 4A illustrates an example graphical user interface 400. The graphical user interface 400 may provide visualization of details of a job (e.g., task). The graphical user interface 400 may enable a user to see and/or modify details of a job. The graphical user interface 400 may include a summary region 402, an internal comment region 404, a manifest region 406, and/or other regions. The summary region 402 may include information relating to the job, such as the name of the job, type of the job, location of the job, time at which the job is to be performed, codes of the job, and/or other information. The summary region 402 may include information that may facilitate performance of the job. For example, the summary region 402 may include directions to the location at which the job is to be performed, notes to suppliers for the job, and/or other information. A user may interact with one or more portions of the summary region 402 to modify the corresponding information. In some implementations, some or all of the information contained within the summary region 402 may be auto-populated using information from one or more data sources.

The internal comment region 404 may include comments exchanged between persons internal to a company about the job. The comments within the internal comment region 404 may be tagged with information relating to the comments, such as who made the comment and/or when the comment was made. The comments within the internal comment region 404 may not be visible to external personnel, such as suppliers for the job.

The manifest region 406 may include information on materials relating to the job. For example, the manifest region 406 may include information on materials to be delivered for the job, materials to be used for the job, and/or other materials relating to the job. A user may interact with an edit element 412 to modify the materials (e.g., add new material, remove existing material, change material properties, such as quantity and/or supplier).

Figure 4B:
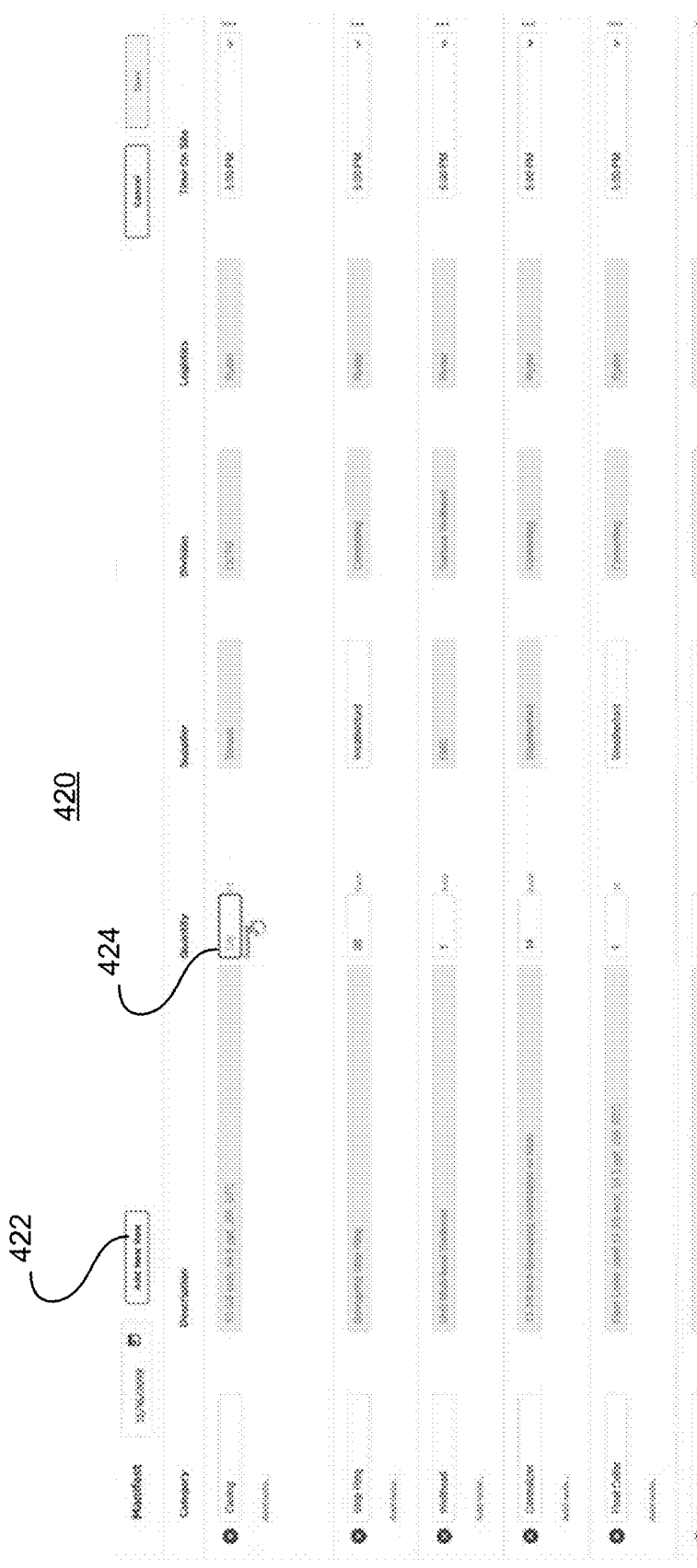

For example, user interaction with the edit element 412 may case the graphical user interface 420 of FIG. 4 to be presented. The graphical user interface 420 may enable a user to remove an item from the manifest, add an item to the manifest, add notes to the items, and/or change properties of the items on the manifest. For example, a user may interact with the add element 422 to add a new item row to the manifest. A user may interact with a quantity element 424 to change to quantity of items.

The graphical user interface 420 may aid users in filling out the form. For example, one or more entries on the graphical user interface 420 may be auto-populated and/or recommended based on the job and/or details relating to the job. The graphical user interface 420 may provide indications on what entries must be filled out. The graphical user interface 420 may provide check on the list of items in the manifest. For example, the graphical user interface 420 may provide an alert and/or a warning if a user attempts to add duplicative items on the manifest, or may prevent a user from adding duplicative items on the manifest. A user may be prevented from saving a new entry/changes to the manifest without filling out all of the required information for the items. The graphical user interface 420 may enable a user to change the times at which the items are to be present at the site. The times of items may be changed individually or as a group.

Figure 4C:
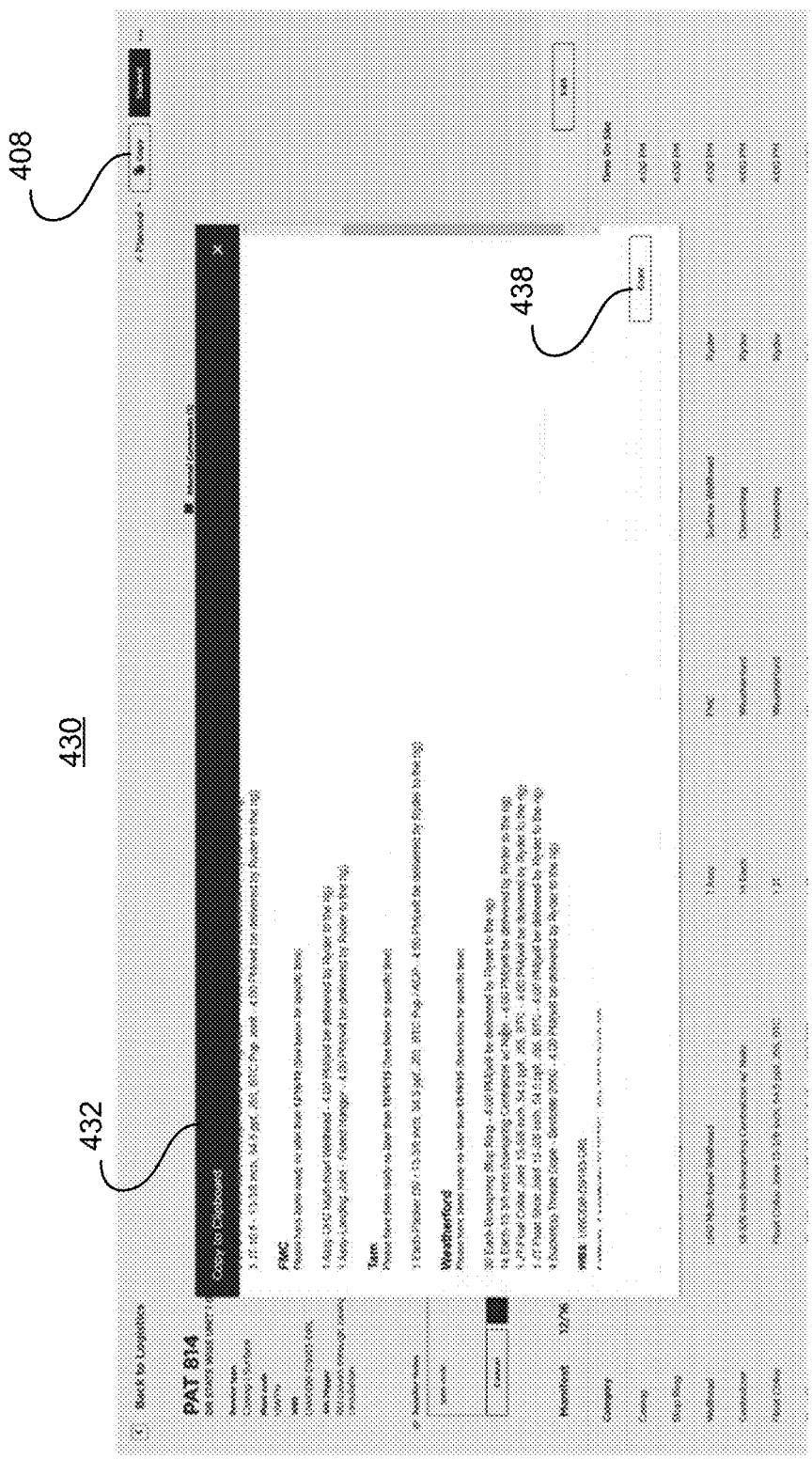

Referring back to FIG. 4A, a user may interact with a copy element 408 to copy some or all of the information presented within the graphical user interface 400. For example, user interaction with the copy element 408 may result in information needed to order the items in the manifest being copied. In some implementations, copied information may be presented within one or more windows. For example, FIG. 4C shows an example graphical user interface 430 with a copy to clipboard window 432. The copy to clipboard window 432 may show the information copied based on user interaction with the copy element 408. In some implementations, the information copied may be formatted within the copy to clipboard window 432. A user may copy the formatted information by interacting with a copy element 438 within the copy to clipboard window 432 (e.g., to paste into an order form and/or an email to the supplier).

Figure 5:
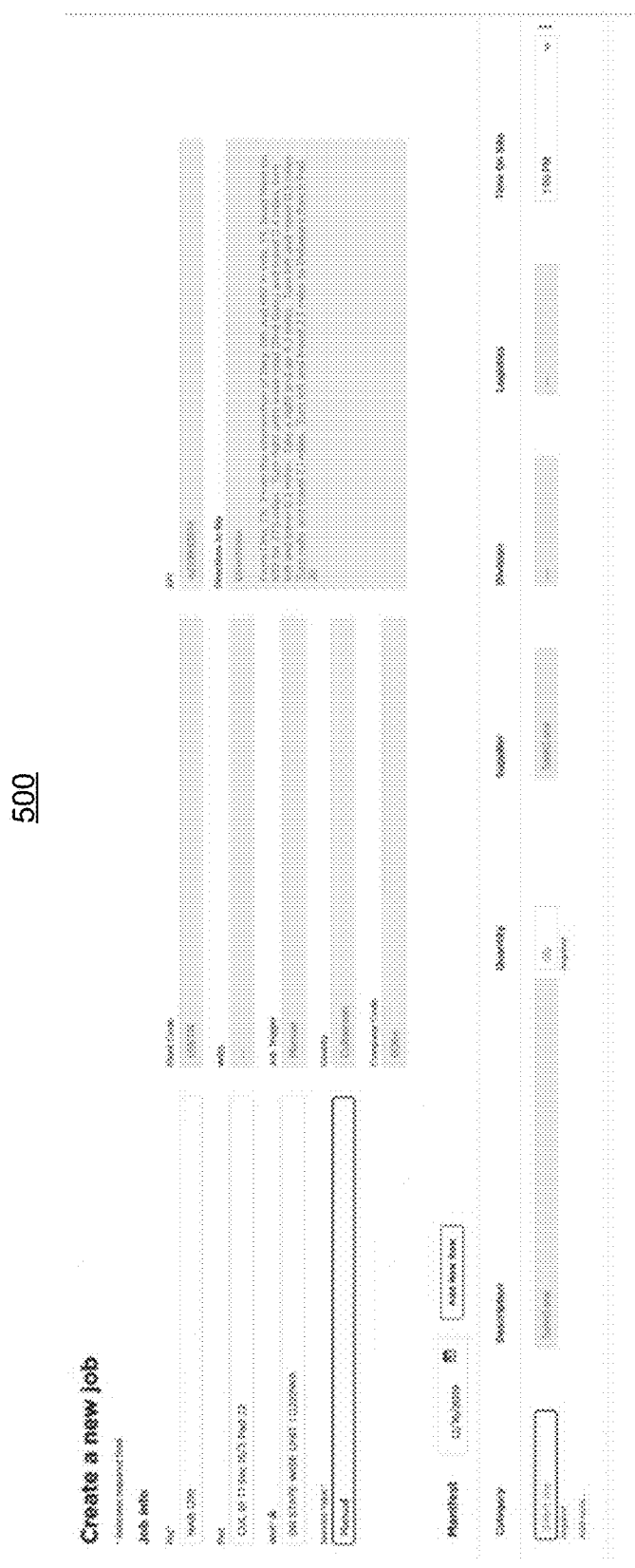
FIG. 5 illustrates an example graphical user interface.

FIG. 5 illustrates an example graphical user interface 500. The graphical user interface 500 may facilitate a user in inputting information to create a new job by providing a form to enter information. The graphical user interface 500 may include fields in which a user may enter and/or select information to create a new job. For example, the graphical user interface 500 may include fields in which a user may enter and/or select information to define job information, manifest information, and/or other information. I The graphical user interface 500 may aid users in filling out the form. For example, one or more entries on the graphical user interface 500 may be auto-populated and/or recommended based on the job and/or details relating to the job. For instance, based on selection particular rig, pad, well, and/or service type, the information associated with the rig, pad, well, and/or service type may be auto populated within the user interface 500. The graphical user interface 500 may narrow the options for different fields based on entered information. For example, based on user selection of a particular rig, the graphical user interface may present pads at the selected rig for selection. The graphical user interface 500 may provide indications on what entries must be filled out to create a new job.

Figure 6A:
FIGS. 6A, 6B, 6C, and 6D illustrate example graphical user interfaces.
Figure 6B:
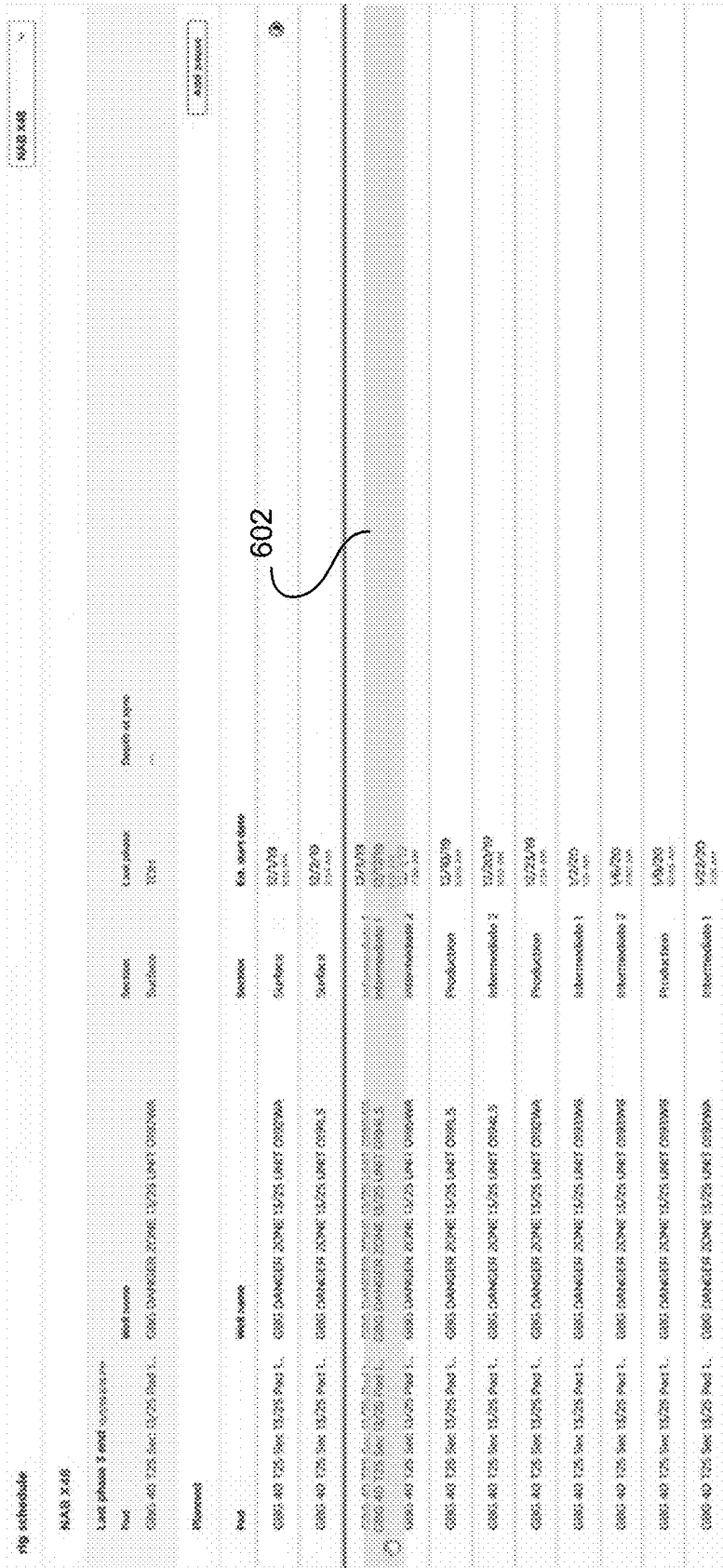
Figure 6C:
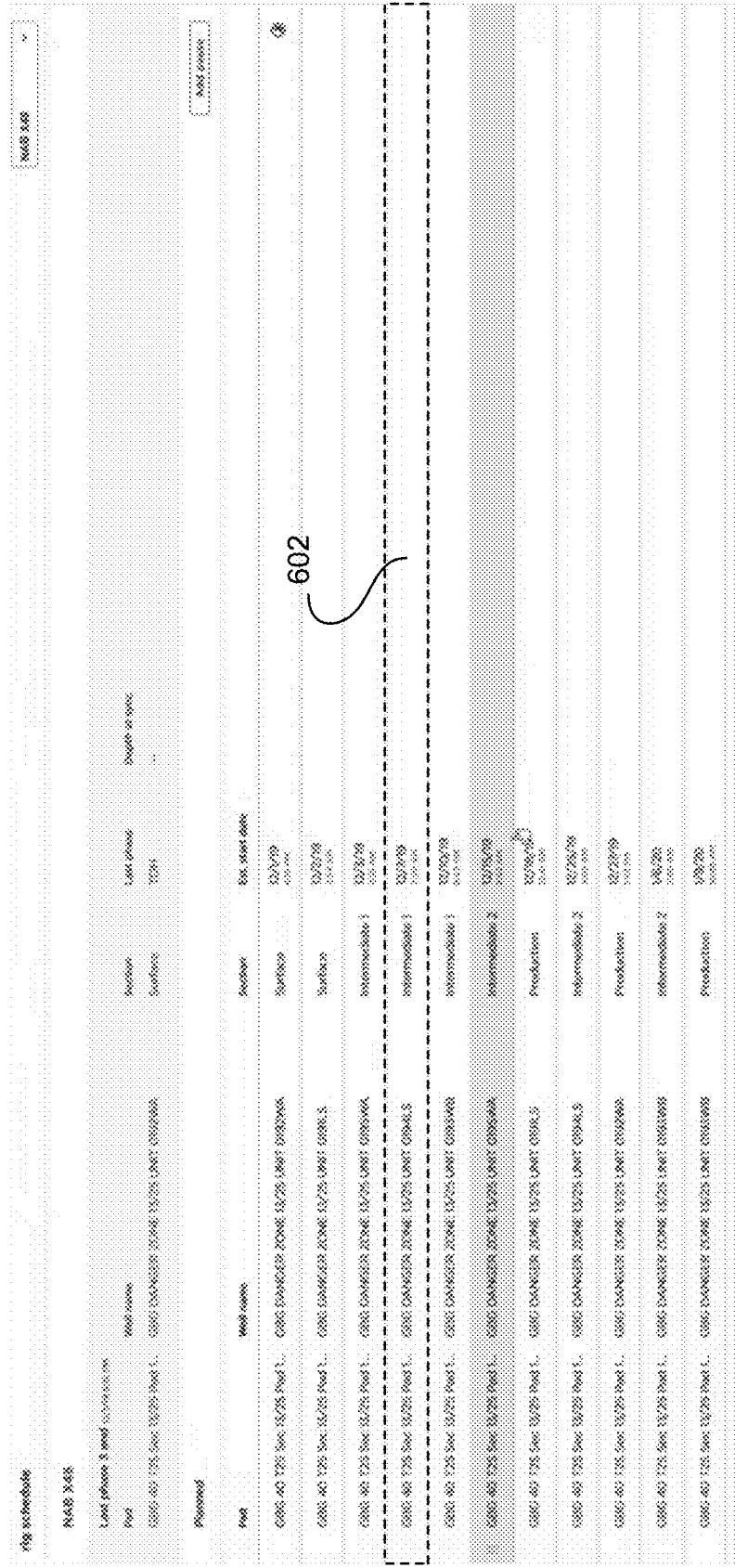

FIGS. 6A, 6B, 6C, and 6D illustrates an example graphical user interface 610. The graphical user interface 610 may provide visualization of a rig schedule. For example, individual rig operations may be organized as individual rows within the graphical user interface 610, with the rows arranged in accordance with the recommended/scheduled time of operation performance. A user may interact with the rows to move the time associated with the corresponding operation. For example, a user may click and drag a row 602 to change the performance time associated with the corresponding operation. An example of the row 602 being dragged within the graphical user interface 610 is shown in FIG. 6B. FIG. 6C shows an example of the graphical user interface 610 in which the row 602 has been placed as the fourth row.

The movement of the row 602 may cause the timing of the corresponding operation and/or other operations to be changed. For example, based on historical data relating to the corresponding operation and/or other operations, the timing of the operations may be changed to reflect the predicted timing of the operations with the new ordering of operations. In some implementations, the timing of operations may be changed based on movement of the rows. In some implementations, the timing of operations may be changed based on other/additional user interaction with graphical user interface 610, such as a user interacting with a recalculate element after one or more rows have been moved.

Figure 6D:

FIG. 6D shows an example add pause element 604. A user may interact with the add pause element 604 to add pause to the rig schedule. For example, user interaction with the add pause element 604 may cause an add pause field 606 to be presented. A user may interact with the add pause field 606 to specify the length of pause to be inserted. As another example, user interaction with the add pause element 604 may cause an add pause window to be presented. A user may interact with the add pause window to specify the length of pause to be inserted.

The graphical user interface 610 may present other information relating to the operations. For example, a progress icon 608 may be presented for operations that have started and have not yet finished. Recalculation of timing of operations may take into consideration progress of operations. For example, to estimate the starting time for an operation following an in-progress operation (as indicated by the progress icon 608), the extent to which the in-progress operation has been performed may be considered to more accurately predict the starting time. As another example, the graphical user interface 610 may present information/notification on difference between recommended/estimated times for operations (e.g., updated based on changes in row) and planned times for the operations.

Figure 7A:
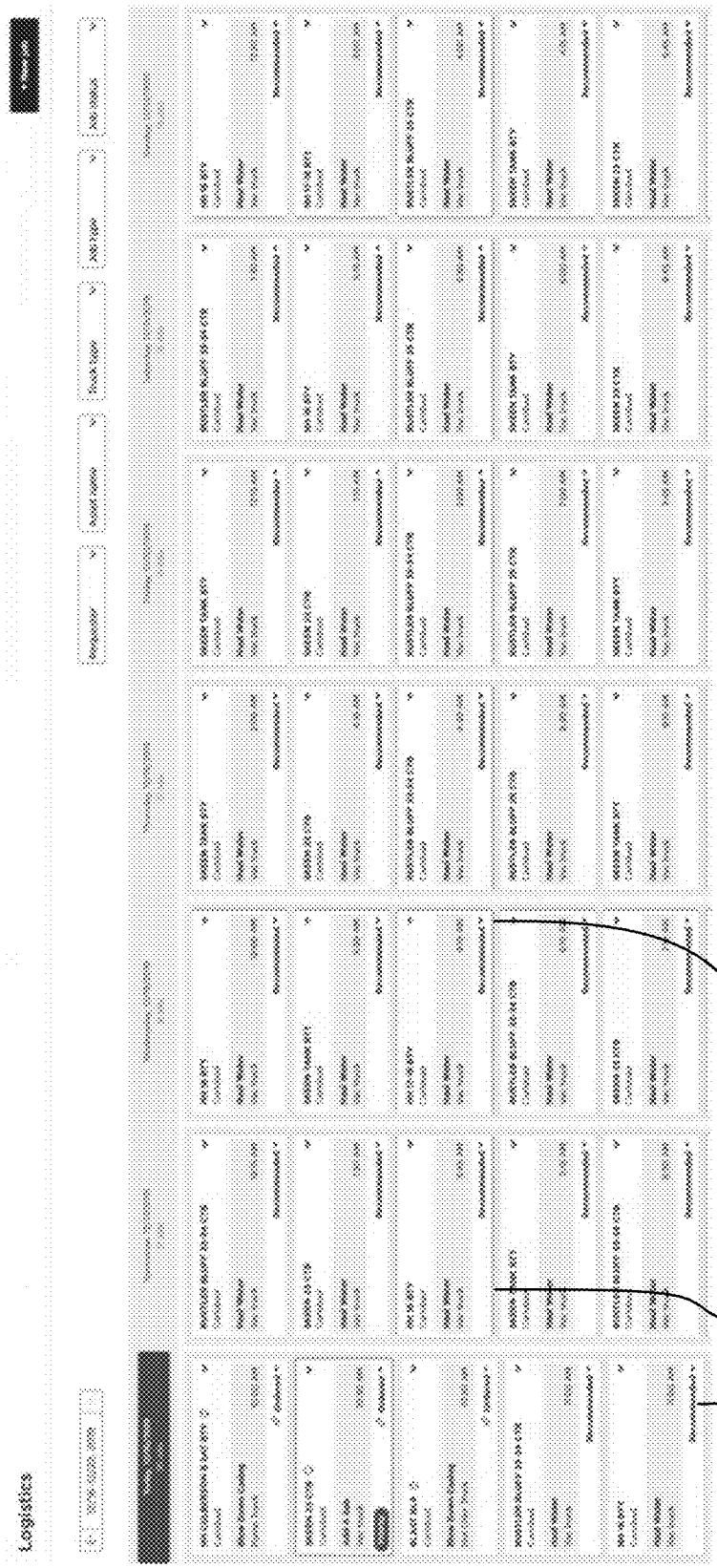
FIGS. 7A, 7B, and 7C illustrate example graphical user interfaces.

FIG. 7A illustrates an example graphical user interface 710. The graphical user interface 710 may provide visualization of well operation tasks for a duration of time, such as for seven days. Individual well operations tasks may be referred to as jobs. The graphical user interface 710 may include card elements 712 representing jobs (e.g., scheduled jobs, planned jobs, recommended jobs, ordered jobs) within a single week. For example, the card elements 712 may represent jobs to haul water from a rig site. The card elements 712 may be arranged within the graphical user interface 710 based on the sequence in which the corresponding jobs are to be performed. The timing of the jobs may be predicated based on rig operation, water tank sensor data, water hauling vehicle capacity, water hauling vehicle availability, water hauling vehicle location, and/or other information.

The card elements 712 may include information relating to the correspond jobs, such as name of the job, type of the job, location of the job, time at which the job is to be performed, and/or other information. In some implementations, the card elements 712 may include information on status of the corresponding jobs, such as whether the job has been recommended, planned, re-scheduled, ordered, delayed, canceled, or completed. In some implementation, a user may interact the card elements 712 to change the status of the corresponding job.

The card elements 712 may be moved within the graphical user interface 710 to change the timing associated with the corresponding jobs. The timing of other jobs may be updated in response to change in timing of a particular job. The graphical user interface 710 may facilitate efficiency removal of water from the rig site. For example, a scheduled removal of water may not be utilizing most/full capacity of the water hauling vehicle. The graphical user interface 710 may present information on jobs with light haul (e.g., expected water amount to be hauled is less than a threshold amount; expected water amount to be hauled is less than certain percentage of water hauling vehicle capacity). Such indication may prompt a user to move the job (so that greater amount of water will be available to be hauled away) and/or to combine the job with other light haul job(s). In some implementations, the graphical user interface 710 may present user with options to combine light haul jobs. For example, rather than simply notifying users of light haul jobs, the user may be provided with suggestions on which jobs may be combined together (e.g., based on the haul being from same/proximate area, based on same type of trucks being used, etc.).

Similarly, the graphical user interface 710 may present information on jobs with heavy haul (e.g., expected water amount to be hauled is more than a threshold amount, expected water amount to be hauled is more than certain percentage of water hauling vehicle capacity/more than water hauling vehicle capacity). Such indication may prompt a user to split the job into multiple jobs. In some implementations, the graphical user interface 710 may present user with options to split heavy haul jobs. For example, rather than simply notifying users of light haul jobs, the user may be provided with suggestions on which how the jobs may be split. For example, the graphical user interface 710 may present options to split a heavy haul job into multiple jobs, and to combine one or more of the split portions within an existing haul job.

Figure 7B:
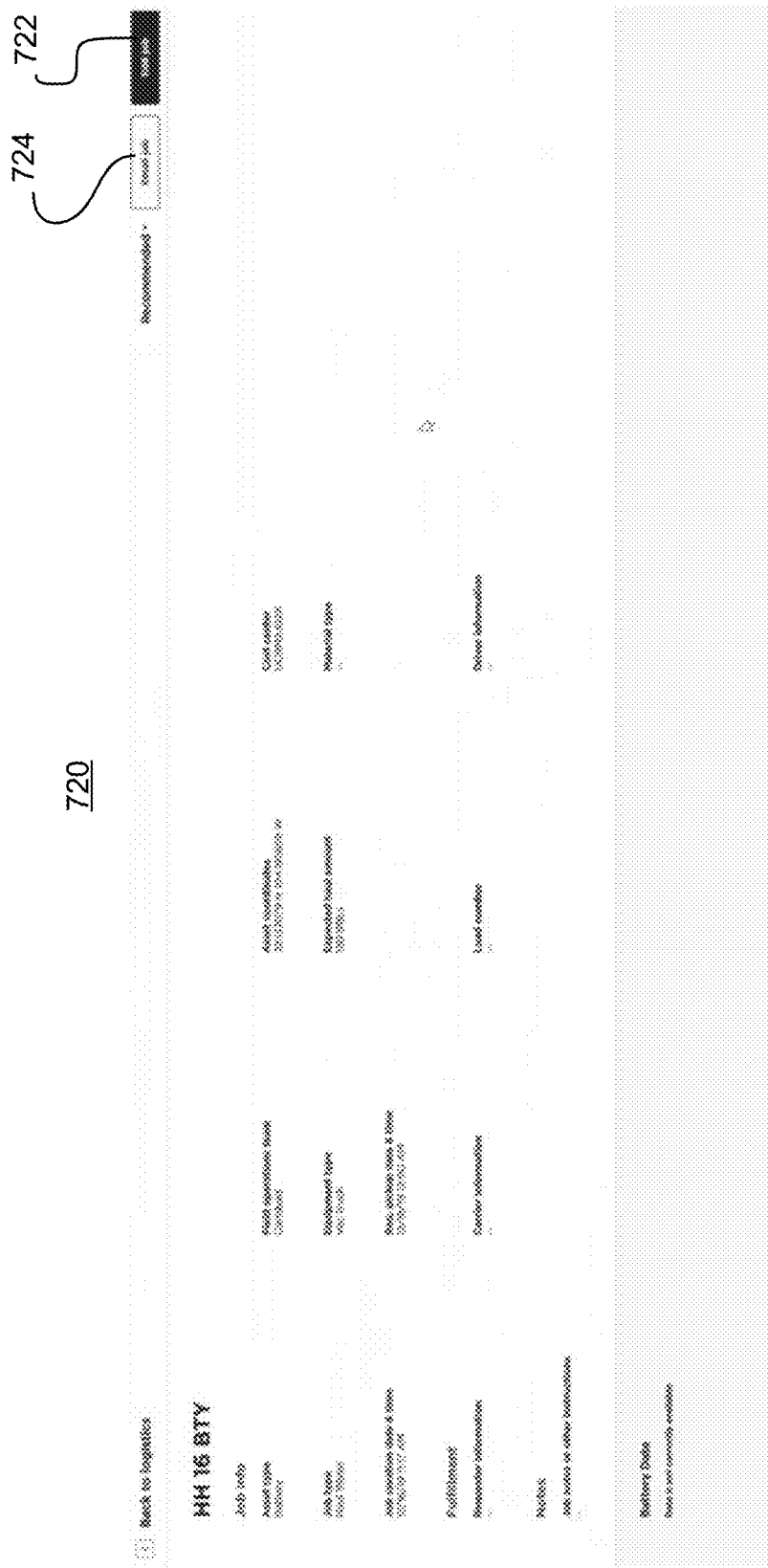
Figure 7C:
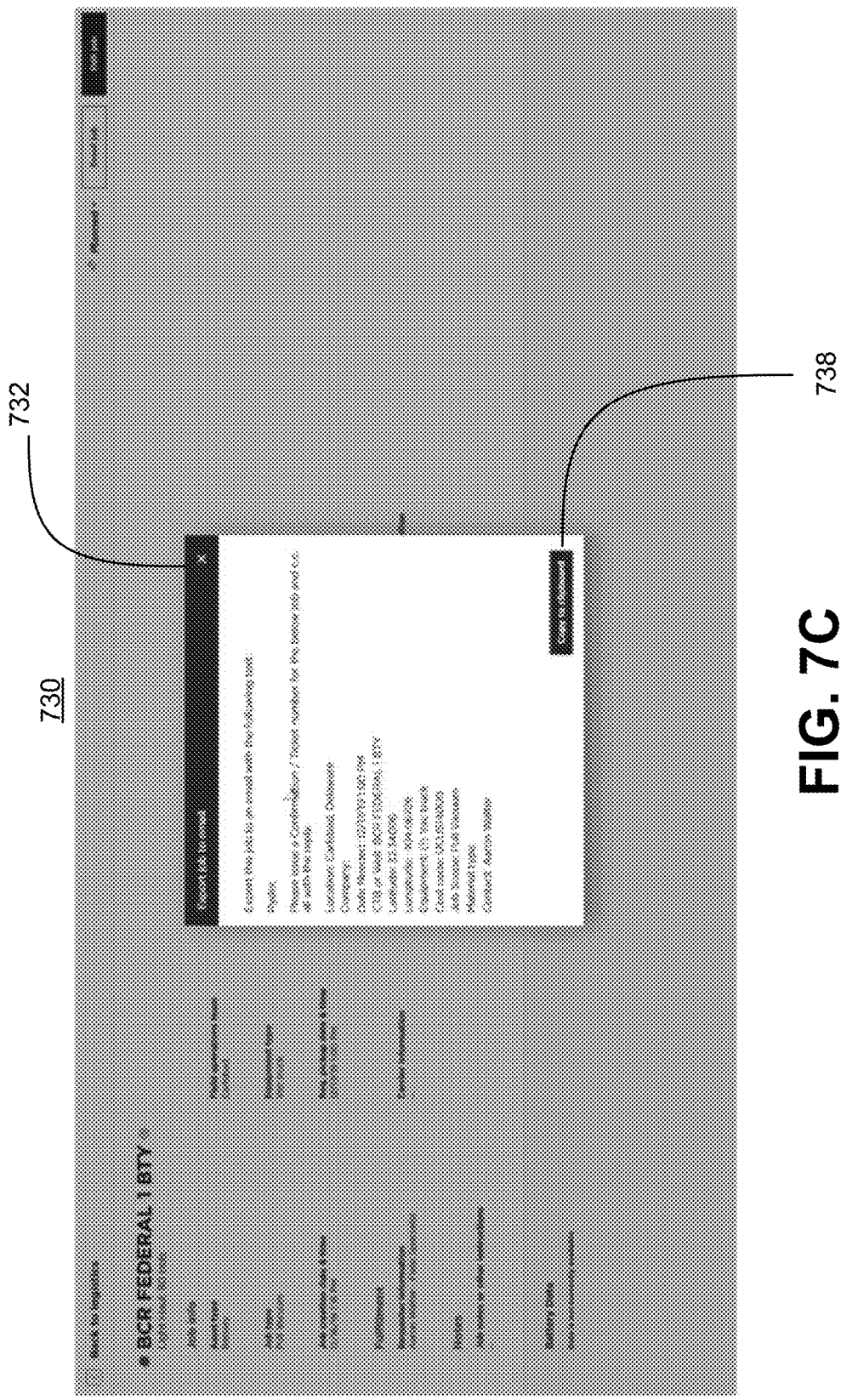

FIG. 7B illustrates an example graphical user interface 720. The graphical user interface 720 may provide visualization of details of a job (e.g., haul job). The graphical user interface 720 may enable a user to see and/or modify details of a job. For example, user interaction with an edit job element 724 may case the graphical user interface 720 to receive input from the user to change one or more details relating to the job. The graphical user interface 720 may enable a user to copy details of a job. For example, user interaction with an email job element 724 may result in some or all of the information presented within the graphical user interface 720 to be copied. For example, user interaction with the email job element 724 may result in information needed to order a water haul server being copied. In some implementations, copied information may be presented within one or more windows. For example, FIG. 7C shows an example graphical user interface 730 with an export job to email window 732. The export job to email window 732 may show the information copied based on user interaction with the email job element 724. In some implementations, the information copied may be formatted within the export job to email window 732. A user may copy the formatted information by interacting with a copy element 738 within the export job to email window 732 (e.g., to paste into an order form and/or an email to the carrier). In some implementations, ordering process may be integrated directly with a supplier system to provide a single portal for interaction between purchasers and suppliers.

Figure 7E:
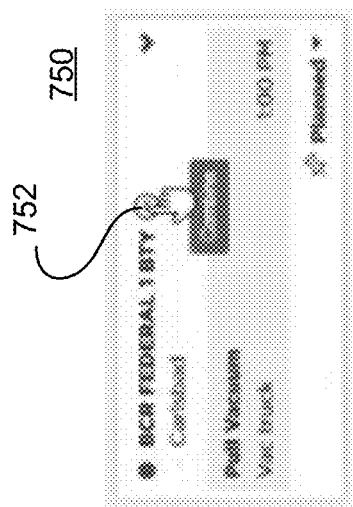
FIGS. 7D and 7E illustrate example portions of a graphical user interface.
Figure 7D:
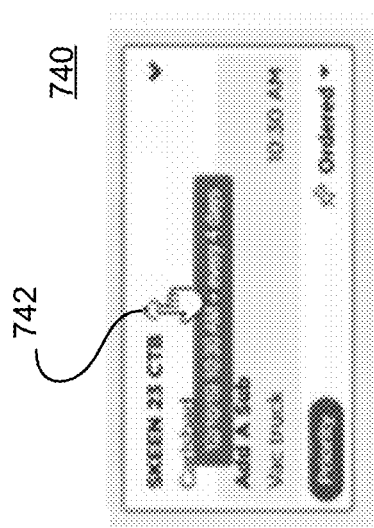

FIGS. 7D and 7E illustrates example portions 740, 750 of a graphical user interface. The portions 740, 750 may include a card element representing a water haul job. The portion 740 may include a repeat icon 742. The repeat icon 742 may indicate that the corresponding job is a job that repeats at regular interval (e.g., every four days). User interaction with the repeat icon 742 (e.g., clicking on the repeat icon 742, hovering over the repeat icon 742) may cause information relating to repetition of the job to be presented (e.g., presentation of time interval at which the job is repeated).

The portion 750 may include a combine icon 752. The combine icon 752 may indicate that the corresponding job is a job that may be combined and/or that is recommended to be combined with another job. User interaction with the combine icon 752 may cause the graphical user interface to present information to combine the corresponding job with other job(s). For example, responsive to user interaction with the combine icon 752, a list of potential jobs with which the corresponding job may be combined may be presented. If there are not potential jobs with which the corresponding job may be combined, the graphical user interface may present a message that no other jobs are available for combination.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
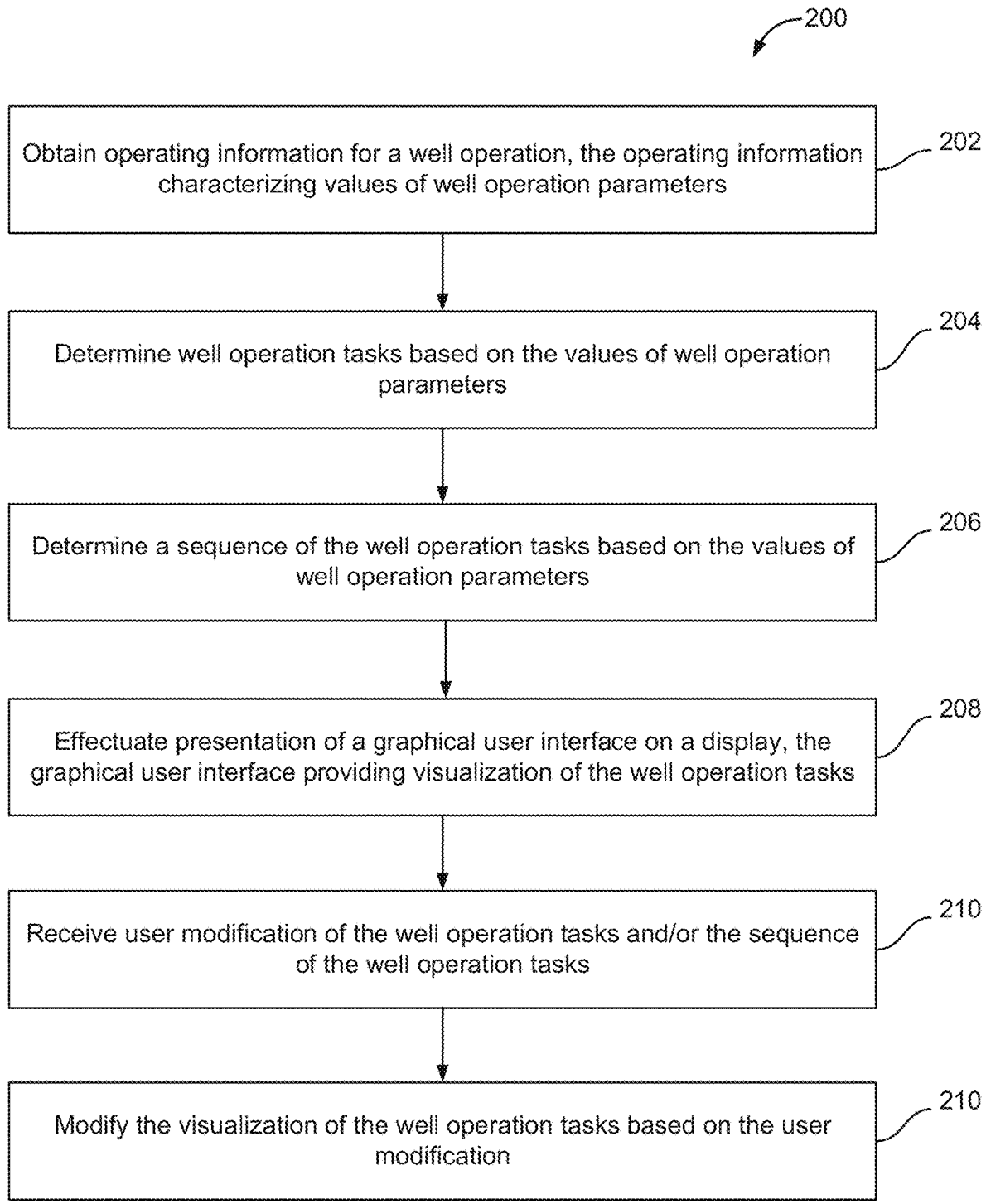
FIG. 2 illustrates an example method for managing tasks.

FIG. 2 illustrates method 200 for managing tasks. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, operating information for a well operation may be obtained. The operating information may characterize values of well operation parameters. The values of well operation parameters may include static values and dynamic values. In some implementation, operation 202 may be performed by a processor component the same as or similar to the operating information component 102 (Shown in FIG. 1 and described herein).

At operation 204, well operation tasks may be determined based on the values of well operation parameters. In some implementation, operation 204 may be performed by a processor component the same as or similar to the task component 104 (Shown in FIG. 1 and described herein).

At operation 206, a sequence of the well operation tasks may be determined based on the values of well operation parameters. In some implementation, operation 206 may be performed by a processor component the same as or similar to the task component 104 (Shown in FIG. 1 and described herein).

At operation 208, presentation of a graphical user interface on a display may be effectuated. The graphical user interface may provide visualization of the well operation tasks. The visualization of the well operation tasks may include the well operation tasks arranged based on the sequence of the well operation tasks. In some implementation, operation 208 may be performed by a processor component the same as or similar to the visualization component 106 (Shown in FIG. 1 and described herein).

At operation 210, user modification of the well operation tasks and/or the sequence of the well operation tasks may be received. In some implementation, operation 210 may be performed by a processor component the same as or similar to the modification component 108 (Shown in FIG. 1 and described herein).

At operation 212, the visualization of the well operation tasks may be modified based on the user modification. In some implementation, operation 212 may be performed by a processor component the same as or similar to the modification component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for managing tasks, the system comprising:
one or more physical processors configured by machine-readable instructions to:
effectuate presentation of a graphical user interface on a display, the graphical user interface providing visualization of well operation tasks as card elements, the well operation tasks ordered in a sequence based on a timing in which the well operation tasks are to be performed, the visualization of the well operation tasks including the card elements arranged within the graphical user interface based on the sequence;
receive user modification of the well operation tasks and/or the sequence of the well operation tasks based on user interaction with the card elements; and
modify the visualization of the well operation tasks based on the user modification, the modification of the visualization of the well operation tasks including modification of the card elements arranged within the graphical user interface;
wherein:
the user modification of the well operation tasks and/or the sequence of the well operation tasks based on the user interaction with the card elements includes user modification of a first well operation task based on the user interaction with a first card element representing the first well operation task;
the user modification of the first well operation task is propagated to at least one other well operation task; and
the modification of the visualization of the well operation tasks includes modification of at least one card element representing the at least one other well operation task to which the user modification of the first well operation task is propagated.

2. The system of claim 1 wherein the user interaction with the card elements includes modification of the arrangement of the card elements to add a new card element, remove an existing card element, or change one or more properties of the existing card element.

3. The system of claim 1 wherein the user interaction with the card elements includes combination of at least two of the card elements that represent a same type of well operation task into a single card element.

4. The system of claim 3, wherein the user interaction with the card elements that include the combination of at least two of the card elements that represent the same type of well operation task into the single card element includes combination of the first card element representing a first material-removal task with a second card element representing a second material-removal task, further wherein the single card element into which the first card element and the second card element are combined represents combination of the first material-removal task and the second material-removal task.

5. The system of claim 1, wherein the at least one other well operation task to which the user modification of the first well operation task is propagated includes a preceding well operation task, a parallel well operation task, or a subsequent well operation task.

6. The system of claim 1, wherein:
the user modification of the first well operation task is propagated to a second well operation task based on the second well operation task being a recommended well operation task; and
the user modification of the first well operation task is not propagated to a third well operation task based on the third well operation task being a planned well operation task.

7. The system of claim 1, wherein:
the user modification of the first well operation task is propagated to a second well operation task based on the second well operation task being a recommended well operation task; and
the user modification of the first well operation task is propagated to a third well operation task based on the third well operation task being a planned well operation task and receipt of user approval of the propagation of the user modification of the first well operation task to the third well operation task.

8. The system of claim 1, wherein:
the first well operation task is a recommended well operation task prior to the user modification of the first well operation task; and
the first well operation task is changed from the recommended well operation task to a planned well operation task based on the user modification of the first well operation task.

9. The system of claim 1, wherein the card elements include information on status of the well operation tasks.

10. The system of claim 9, wherein the information of the status of the well operation tasks included in the card elements include information on whether the well operations tasks are recommended well operations tasks or planned well operation tasks.

11. The system of claim 9, wherein the information of the status of the well operation tasks included in the card elements include information on whether the well operations tasks have been re-scheduled, ordered, delayed, canceled, or completed.

12. The system of claim 1, wherein the user interaction with the card elements includes division of a single card element that represents a single well operation task include multiple card elements that represent sub-parts of the single well operation task.

13. A method for managing tasks, the method comprising:
effectuating presentation of a graphical user interface on a display, the graphical user interface providing visualization of well operation tasks as card elements, the well operation tasks ordered in a sequence based on a timing in which the well operation tasks are to be performed, the visualization of the well operation tasks including the card elements arranged within the graphical user interface based on the sequence;

receiving user modification of the well operation tasks and/or the sequence of the well operation tasks based on user interaction with the card elements; and modifying the visualization of the well operation tasks based on the user modification, the modification of the visualization of the well operation tasks including modification of the card elements arranged within the graphical user interface;

wherein:

the user modification of the well operation tasks and/or the sequence of the well operation tasks based on the user interaction with the card elements includes user modification of a first well operation task based on the user interaction with a first card element representing the first well operation task;

the user modification of the first well operation task is propagated to at least one other well operation task; and the modification of the visualization of the well operation tasks includes modification of at least one card element representing the at least one other well operation task to which the user modification of the first well operation task is propagated.

14. The method of claim 13 wherein the user interaction with the card elements includes modification of the arrangement of the card elements to add a new card element, remove an existing card element, or change one or more properties of the existing card element.

15. The method of claim 13, wherein the user interaction with the card elements includes combination of at least two of the card elements that represent a same type of well operation task into a single card element.

16. The method of claim 15, wherein the user interaction with the card elements that include the combination of at least two of the card elements that represent the same type of well operation task into the single card element includes combination of the first card element representing a first material-removal task with a second card element representing a second material-removal task, further wherein the single card element into which the first card element and the second card element are combined represents combination of the first material-removal task and the second material-removal task.

17. The method of claim 13, wherein the at least one other well operation task to which the user modification of the first well operation task is propagated includes a preceding well operation task, a parallel well operation task, or a subsequent well operation task.

18. The method of claim 13, wherein:

the user modification of the first well operation task is propagated to a second well operation task based on the second well operation task being a recommended well operation task; and the user modification of the first well operation task is not propagated to a third well operation task based on the third well operation task being a planned well operation task.

19. The method of claim 13, wherein:

the user modification of the first well operation task is propagated to a second well operation task based on the second well operation task being a recommended well operation task; and the user modification of the first well operation task is propagated to a third well operation task based on the third well operation task being a planned well operation task and receipt of user approval of the propagation of the user modification of the first well operation task to the third well operation task.

20. The method of claim 13, wherein:

the first well operation task is a recommended well operation task prior to the user modification of the first well operation task; and the first well operation task is changed from the recommended well operation task to a planned well operation task based on the user modification of the first well operation task.

* * * * *